United States Patent [19]

Lenzi et al.

[11] 4,034,721

[45] July 12, 1977

[54] ELECTRICAL INDIRECT PETROL INJECTION SYSTEM FOR OTTO CYCLE ENGINES

[75] Inventors: Giuliano Lenzi, Arese (Milan); Edoardo Rogora, Milan, both of Italy

[73] Assignee: Alfa Romeo S.p.A., Milan, Italy

[21] Appl. No.: 596,085

[22] Filed: July 15, 1975

[30] Foreign Application Priority Data

July 16, 1974 Italy .................. 25235/74

[51] Int. Cl.² ............... F02D 1/04; F02B 3/00
[52] U.S. Cl. .................. 123/32 EB; 123/140 MP; 123/139 AW
[58] Field of Search ............ 123/32 EA, 32 EB

[56] References Cited

U.S. PATENT DOCUMENTS

| 3,721,219 | 3/1973 | Mennesson | 123/32 EA |
| 3,734,067 | 5/1973 | Glockner | 123/32 EA |
| 3,820,517 | 6/1974 | Nambu | 123/32 EA |

Primary Examiner—Ronald H. Lazarus
Assistant Examiner—Ronald B. Cox

[57] ABSTRACT

There is disclosed an electronic indirect petrol injection system for Otto cycle engines, which comprises at least one air intake duct, one electroinjector for each engine cylinder, a feed circuit to feed the petrol to the electroinjectors under pressure, and an electronic assembly for controlling the injection timing during the cylinder intake stage and the duration of injection. The system also comprises a throttle valve located in the engine intake duct, a measuring element for the air flow rate disposed upstream of the throttle valve and a petrol, gas or gasoline pressure modulator arranged in the petrol feed circuit for the electroinjectors. Moreover, the electronic assembly comprises a tachometric unit which provides a signal which is a function of the engine rotation speed, a base electronic unit which processes electrical signals supplied by the tachometric unit and by the measuring element, a refining unit which modifies the time signal originating from the base unit according to the tachometric signal so as to optimize the engine operation at all points throughout its range of use, and a unit arranged to distribute electrical signals for opening the electroinjectors and keeping them open by a suitable timing arrangement.

10 Claims, 8 Drawing Figures

ELECTRICAL INDIRECT PETROL INJECTION SYSTEM FOR OTTO CYCLE ENGINES

In electronic indirect gas or petrol injection systems for one cycle engines, in which the electroinjector injection pressure is kept constant at a predetermined operating value, the delivery of each electroinjector is known to be proportional to the time during which the (fixed) inlet port of the electroinjector remains open. If $m_b$ is the gas or petrol delivery of one electroinjector for each engine cycle, T the time during which it remains open, $p_i$ the injection pressure, equal to $p_b - p_{asp}$, i.e. the gas or petrol pressure drop through the inlet port (equal to the difference between the gas or petrol feed pressure and the pressure in the engine intake duct), then $m_b = T \cdot \sqrt{p_i}$; thus if $p_i$ is kept constant, as happens in many cases, the gas or petrol delivery depends only on the time during which the electroinjector remains open; i.e. a long time of opening allows a high rate of delivery, while a short time of opening permits a low rate of delivery.

In the range of operation of the engine corresponding to low and medium power, the times for which the electroinjectors remain open are very short, because the constant value of the feed pressure $p_b$ of the electroinjectors is chosen at a rather high level to restrict the injection time corresponding to maximum delivery to an acceptable value. Very short injection times lead to inaccuracy. In this respect, the shorter the injection time the greater the influence of the electroinjector opening and closing transients; the influence of these transients is independent of the time of injection and constitutes a large part of the time of injection itself, if the latter is very small. Consequently the inaccuracy in metering the gas or petrol is the higher on a percentage basis, the smaller the delivery of the electroinjectors. It is notably not easy to reduce the transients to obtain appreciable improvements in the metering of the gas or petrol. There are therefore metering errors at low and medium power, even though the signals which reach the electroinjectors are correct and exactly represent the engine requirements for the different operating conditions.

The system, according to the present patent application, has been developed essentially to solve this problem. In this system, the pressure of the gas or petrol which reaches the electroinjectors is not constant, but is variable in accordance with the required law from a lower value to a higher value, so that for low deliveries a reduced electroinjector delivery pressure is available. This enables the time during which the electroinjectors remains open for equal deliveries to be extended. By increasing the injection times for low deliveries, the percentage influence of the transients is obviously reduced, thus minimising metering errors due to these transients.

Thus in the system proposed, the gas or petrol delivery depends not only on the injection time, but also on the electroinjector injection pressure. For small deliveries the injection pressure is low and the injection time is small, but the latter is always greater than the value for the same delivery at constant gas or petrol pressure. At high deliveries, the injection time and feed pressure are large.

For correct operation of the system, the injection pressure should conveniently vary as a function of a parameter which indicates the engine operating condition. Our researches have shown that it is advantageous to relate the injection pressure to the flow rate of the engine air intake, and vary the injection pressure as a function of an air pressure drop which may be taken as an indication of the flow rate. It is not convenient to use an air flow measuring element in the form of a port of fixed cross-section, as this would lead to high pressure drop at high flow rate. Thus to obtain pressure drops of appreciable value at low deliveries, a measuring element for the flow rate of the engine air intake is used which consists of a throttle member which presents an air passage port having a cross-section which varies with the flow rate itself, and is able to induce a pressure drop in the air flow which is also variable as a function of the flow rate. The rate of engine air intake $Q_a$, the cross-section $A_a$ of the air passage port, and the pressure drop $\Delta p_a$ through the port $A_a$ are related by the expression:

$$Q_a \equiv A_a \sqrt{\Delta p_a}$$

which shows that the two signals which can be obtained from the flow measuring element described, one consisting of the pressure drop $\Delta p_a$, and the other a function of $A_a$, both indicative of the flow rate, give a signal proportional to the flow rate when combined.

In our case a basic injection adjustment was provided in which the gas or petrol delivery $m_b$, and the quantity of air drawn in by the engine per cycle $M_a = (Q_a/n)$ ($n$ = engine r.p.m.) are related by a mixture ratio A/B, whose value depends only on the power delivered by the engine and is independent of its speed of rotation. Thus for any value of the power, $(M_a/m_b) = (A/B) =$ a constant (where the value of the constant is a parameter which is a function of the power), and therefore:

$$(A_a \sqrt{\Delta p_a}/n) \equiv T \sqrt{p_i}$$

This equation is satisfied by adjusting the injection time T and the injection pressure $p_i$ separately in such a manner as to satisfy the two partial relationships $$T \equiv \frac{(A_a/n)}{\sqrt{p_i}} = \sqrt{\Delta p_a}$$

Provision was therefore made to vary the injection pressure $p_i$ as a function of the air pressure drop $\Delta p_a$, using for the modulation of the injection pressure the signal indicative of $\Delta p_a$ as supplied by the flow measuring element, and to vary the injection time T as a function of the cross-section of the air passage port $A_a$ and the engine rotational speed $n$, using for the adjustment a signal proportional to $A_a$ as supplied by the flow measuring element, and a signal related to the rotational speed n obtained from the drive shaft. Certain components of the electronic assembly of the injection system process the electrical signal proportional to the cross-section of the air passage port provided by a mechanical-electrical transducer associated with the flow measuring element and the electrical signal related to the engine rotational speed provided by a second mechanical-electrical transducer associated with the drive shaft, to result in an electric signal which represents the necessary injection time for each electroinjector to provide the gas or petrol delivery corresponding to a determined mixture ratio, with the injection pressure controlled so that $p_i \equiv \Delta p_a$. In this manner a basic adjustment of the gas or petrol delivery is provided by obtaining the time signal, i.e. one of the terms of the delivery equation, from the signal proportional to the cross-section of the air passage, which in its turn is a function of the quantity of air drawn in by the engine per cycle.

Other components of the electronic assembly provide a refinement to the basic adjustment in such a manner that for each engine operating condition the most appropriate mixture ratio is obtained for optimising the engine performance, and minimising the discharge of pollutants to the exhaust.

A gas or petrol delivery adjustment of the type proposed by us, based on the simultaneous variation of the injection time and injection pressure as a function of the rate of engine air intake is also advantageous to the metering accuracy. It minimises errors due to response times to the insensitivity of the transducer associated with the flow measuring element when measuring small changes in flow rate. In this respect, the transducers are generally provided with a mobile element which induces changes in an electrical quantity when it moves (in our case the mobile element of the transducer engages with the throttle member which governs the variable cross-section port of the flow measuring element). The friction to which the mobile element is subjected, and which is often considerable, prevents its movement or alters its value when changes in the measured quantity are small.

In the system provided by us, changes in air flow rate which cannot be measured correctly by the throttle member and the relative transducer because of the insensitivity caused by friction in the transducer, and which therefore cannot influence the gas or petrol delivery in this manner, give rise instead to changes in the pressure drop $\Delta p_a$ which may be easily measured and used to provide changes in the gas or petrol injection pressure $p_i$. Thus a truly precise and correct metering of the gas or petrol delivery is obtained, together with a quicker response time because of the reduction in influence of the delays due to friction in the transducer.

The system provided by us comprises at least one air intake duct, one electroinjector for each engine cylinder, a feed circuit to feed the gas or petrol to the electroinjectors under pressure, and an electronic assembly for controlling the injection timing during the cylinder intake stage and the duration of injection; the system also comprises a butterfly throttle valve in the engine intake duct for throttling the air drawn in, and a measuring element for the air flow rate disposed upstream of the throttle valve and consisting of a throttle member which defines the cross-section of the air passage port, this cross-section varying with the engine air intake rate, as does also the pressure drop undergone by the air in traversing said port, with the throttle member there being associated a first mechanical-electrical transducer which emits an electrical signal indicative of the position assumed by the throttle member; the system also comprises, in the gas or petrol feed circuit for the electroinjectors, a gas or petrol pressure modulator arranged to vary the pressure as a function of the intake air pressure drop through the throttle member; it also comprises a second transducer arranged to supply an electrical signal containing tachometric and phase information relative to the drive shaft, the second transducer being associated with a shaft rotating at a speed proportional to the speed of the drive shaft and suitably phase displaced relative to the drive shaft; the electronic assembly also comprises a tachometric unit which processes the electrical signal from the second transducer and provides a signal which is a function of the engine rotation speed, and a basic electronic unit which processes the signal supplied by the tachometric unit and the electrical signal indicative of the position of the throttle member and originating from the first transducer, and provides an electrical signal which represents the time for which each electroinjector needs to remain open to provide, with the gas or petrol feed pressure controlled by the modulator, the gas or petrol delivery corresponding to a predetermined mixture ratio value; the electronic assembly also comprises a refining unit which, for each pair of values represented by the signal originating from the base unit and the tachometric signal, modifies the time signal originating from the base unit (and hence the gas or petrol delivery to the electroinjectors and the mixture ratio) in such a manner as to optimise the engine operation at all points throughout its range of use; the electronic assembly also comprises a unit arranged to distribute with suitable timing to the electroinjectors the electrical signal which determines the opening and continuance of opening of each electroinjector for the time determined by the signal provided by the refining unit.

The electronic assembly can also be provided with a correction unit which emits a signal arranged to vary the output signal from the refining unit under those special engine operating conditions under which additional petrol feed is required.

The objects and advantages of our system will be more evident from an examination of FIGS. 1–8 which diagramatically represent some preferred embodiments of the invention by way of example.

Figure 1:
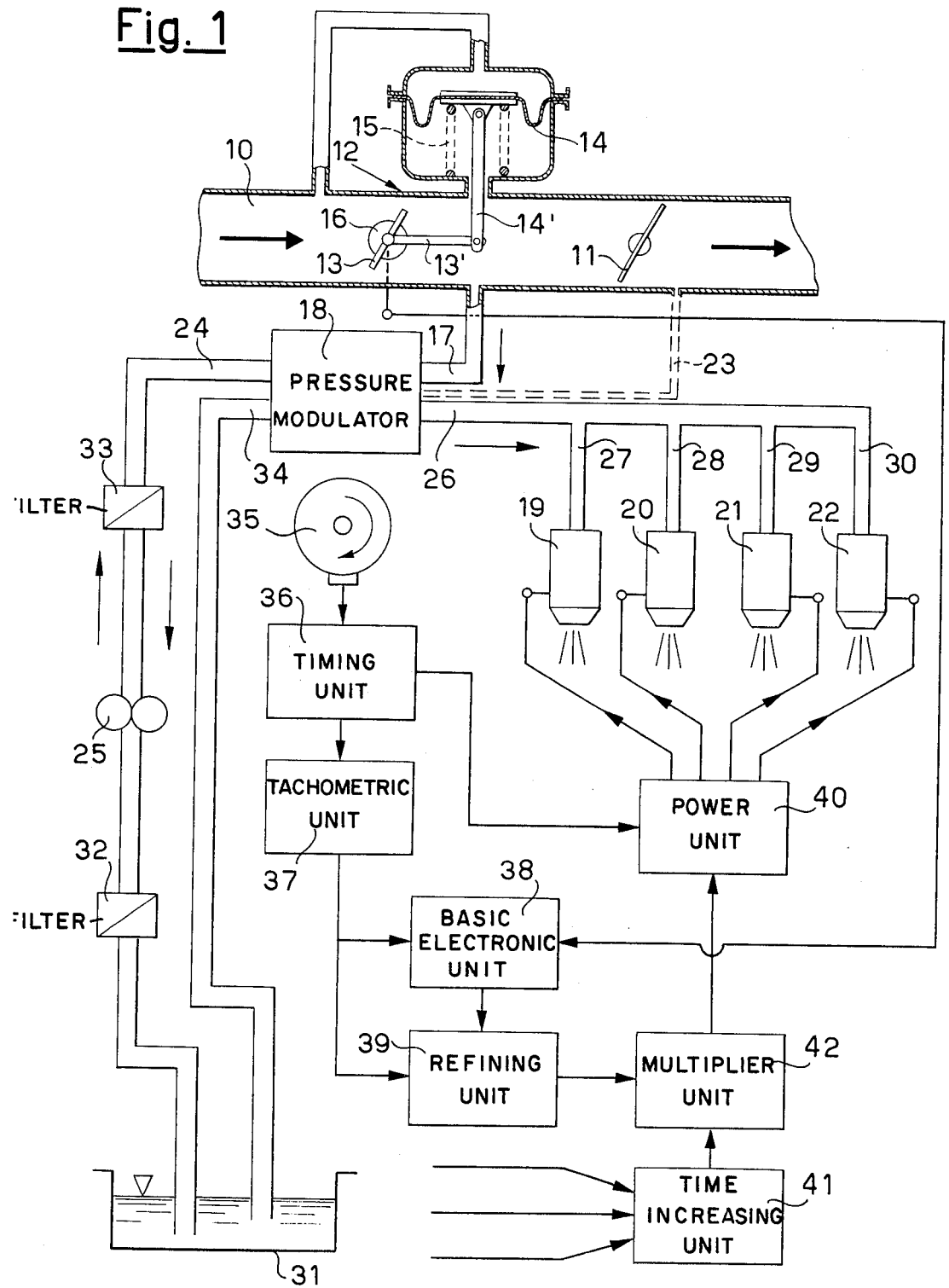
FIG. 1 shows the circuit diagram of the injection system, according to the present patent application.

In this figure, the intake duct of an internal combustion engine is indicated by the reference numeral 10, and the butterfly throttle valve of the engine intake air by the reference numeral 11. The throttle valve is controlled, as usual, by the accelerator pedal (not shown).

Upstream of the throttle valve 11 in the duct 10 is disposed a measuring element for the air flow rate, consisting of the throttle member 12. The variable area port left free by the throttle member is a function of the engine air intake rate, as is the pressure drop undergone by the air in traversing the said port. The member 12 consists of a butterfly valve 13, a membrane 14 to which the butterfly valve is connected by the lever 13' and the rod 14', and a reaction spring 15 which engages with the membrane. The pressure upstream of the butterfly valve 13 acts on one face of the membrane 14, and the pressure downstream of the same butterfly valve acts on the other face of the membrane.

When the engine air intake rate varies, the pressure downstream of the butterfly valve 13 and the force acting on the butterfly valve due to the pressure diffference $\Delta pa$ across the membrane 14 also vary. The butterfly valve is made to rotate about its axis until the force due to Δpa and the reaction of the spring 15 are in equilibrium on the membrane 14. The butterfly valve defines an air passage port which increases or decreases with the flow rate. The law which governs the movement of the butterfly valve is thus a function of the engine air intake rate, the rigidity characteristic of the spring 15 being noted. A mechanical-electrical transducer 16 is connected to the butterfly valve 13. The mobile element of the transducer, which may for example be of the potentiometric type, induces a variation in an electrical quantity which is thus indicative of the angle of rotation $\alpha a$ of the butterfly valve 13. This electrical signal may, in the case of a spring 15 of suitable characteristics, be proportional to the air passage cross-section in the duct 10, $\alpha a \equiv A_a$, and is therefore a function of the engine air intake rate.

A tube 17 branches from the duct 10 in the region between the member 12 and butterfly valve 11, and is connected to the pressure modulator 18 connected into the circuit of the gas or petrol feed to the electroinjectors 19, 20, 21, 22 (which are four in number, as the engine considered has four cylinders). A tube 23, indicated with a dashed line in FIG. 1 and branching from the duct 10 downstream of the throttle valve 11 before the cylinder inlet, may also lead to the modulator 18.

Figure 2:
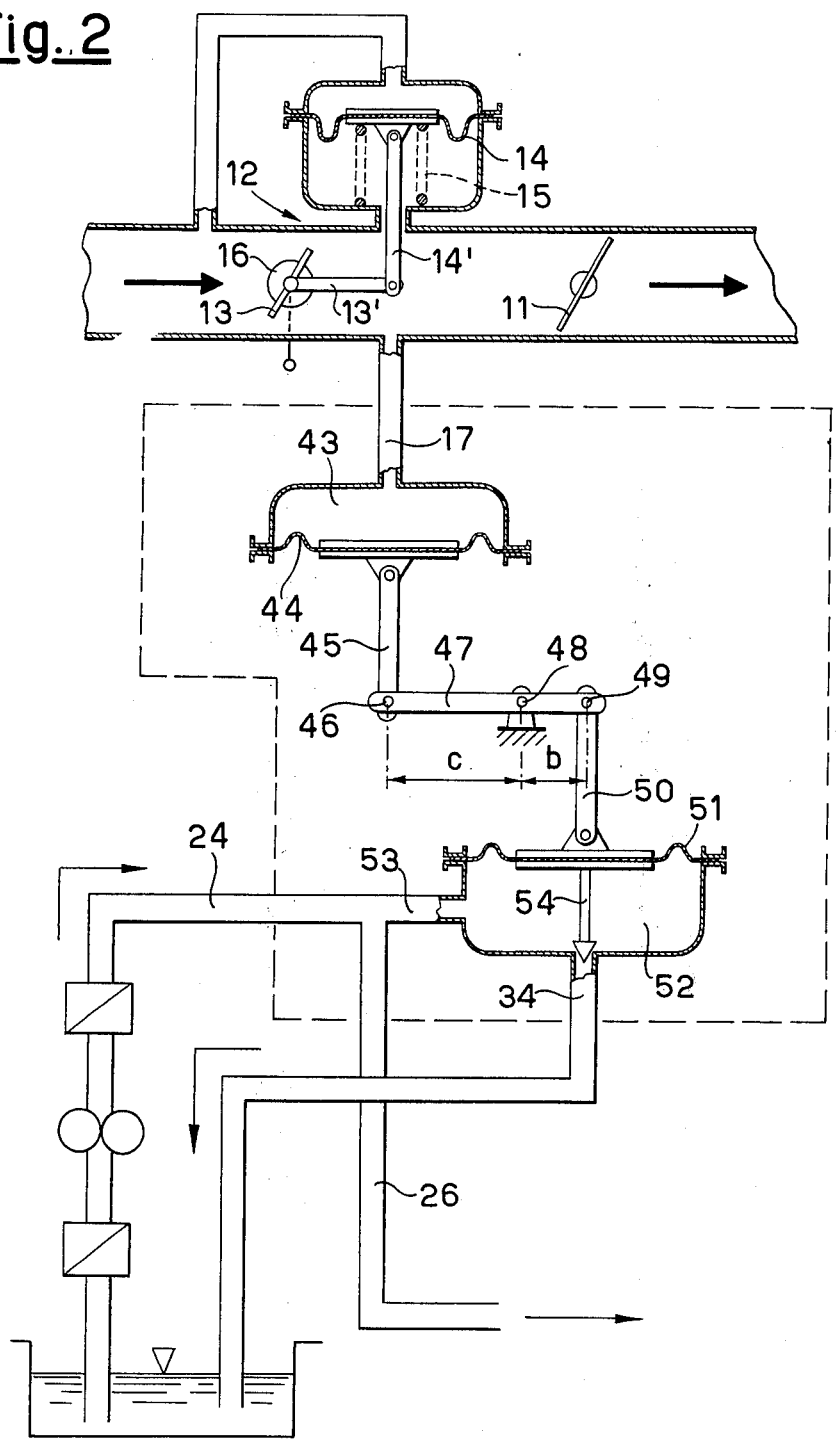
FIGS. 2 and 3 show details of two embodiments of unit 18.
Figure 3:
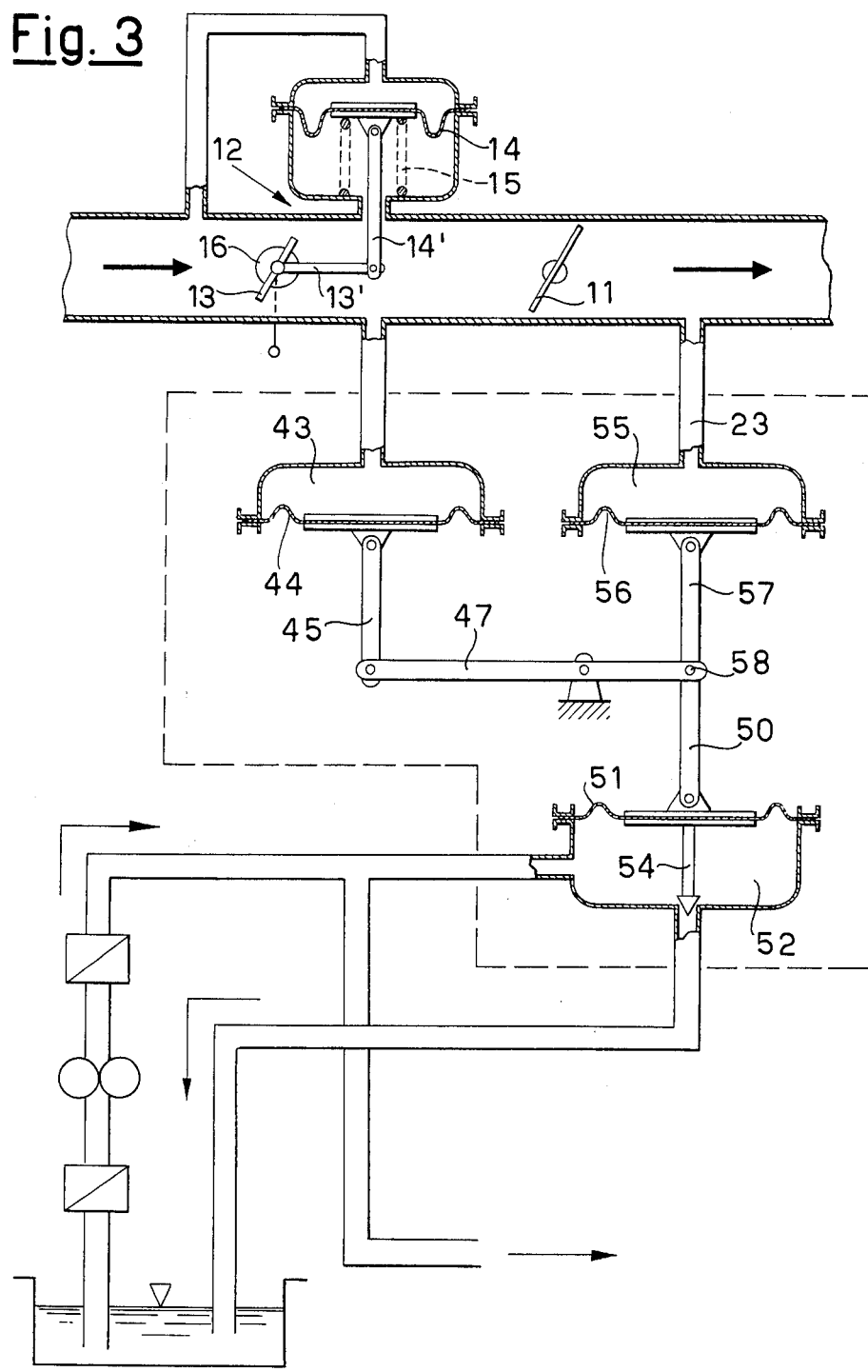

The purpose of the unit 18, shown in detail in FIGS. 2 and 3, is to control the pressure of the gas or petrol fed to the electroinjectors by correlating it with the pressure downstream of the member 12 and possibly with the pressure at the cylinder intake. The result is that the injection pressure is also a function of the engine air intake rate, as it varies as a function of the pressure drop undergone by the air in traversing the butterfly valve 13.

The modulator 18 is connected between the delivery duct 24 of the pump 25 and the duct 26, from which the individual ducts 27, 28, 29, 30 lead to the electroinjectors branch. A return duct 34 returns the gas or petrol to the tank 31. The gas or petrol pump 25 dips into the tank 31 through the filter 32. A second filter 33 is disposed on its delivery side.

The quantity of gas or petrol fed at each cycle by each electroinjector is a function of the time for which the electroinjector remains open and of the injection pressure, i.e. the difference between the gas or petrol pressure and the pressure (or rather the suction) in the intake duct downstream of the throttle valve in the region in which the electroinjector delivers.

As stated, $$m_b \equiv T \sqrt{P_i} = T \sqrt{P_b - p_{asp}}$$
$$M_a \equiv (Q_a/n) \equiv (A_a \sqrt{\Delta P_a}/n$$

and also, for a certain mixture ratio A/B:
$$m_b \equiv M_a$$

and therefore
$$T \sqrt{P_i} = (A_a \sqrt{\Delta P_a}/n$$

The modulator 18 adjusts the gas or petrol pressure in such a manner that $p_i = p_b - p_{asp} \equiv \Delta p_a$, as will be explained in greater detail with reference to figures 2 and 3. The electronic assembly, shown in FIG. 1 as blocks, adjusts the time for which each electroinjector remains open, which it derives from the signal indicative of the air passage cross-section (a function of the flow rate), in accordance with the relationship $T \equiv (A_a/n)$.

The electronic assembly for regulating the injection time comprises a unit 35 consisting of a member rotating at a speed proportional to the speed of the drive shaft, and a mechanical electrical transducer which emits a signal containing tachometric and phase information. The output signal from the unit 35 enters the timing unit 36, where it is converted into a signal of a type suitable for utilisation in the subsequent components of the electronic assembly. For example the signal supplied by the unit 35 may be a pulse signal, and it may be necessary for this signal to be converted in the subsequent unit 36 into a pulsating signal of suitable form.

The output signal from the unit 36, which always contains phase information and tachometric information, reaches the unit 37 where it is processed to extract its tachometric information, obtaining a signal from it which is a function of the engine rotation speed $f(n)$.

A basic electronic unit 38 receives the tachometric signal provided by the unit 37 and the signal indicative of the engine air intake rate, emitted by the transducer 16. These two signals are combined in the unit 38 in accordance with the relationship $(\alpha_a/n) \equiv (A_a/n)$ to held a signal proportional to one of the two terms which appear on the second side of the delivery equation $M \equiv (A_a \sqrt{\Delta P_a}/n)$; this signal is emitted in the form of time, $T_B \equiv (\alpha a/n)$ and represents the necessary time of opening for the delivery of an electroinjector, under an injection pressure $p_i$ controlled by the modulator, to be proportional (in accordance with a predetermined ratio) to the quantity of air drawn in by one cylinder per cycle. The signal $T_B$ thus represents the delivery of an electroinjector corresponding to a predetermined constant mixture ratio, and must be modified so that under different operating conditions the mixture ratio may be made the most appropriate for optimising the engine performance. This operation takes place in the refining unit 39 into which the signal $T_B$ and the tachometric signal derived from the unit 37 enter. The signal $T_B$ is corrected according to the speed of rotation of the engine and is converted into a time signal T which represents the delivery of an electroinjector corresponding to the mixture ratio required by the engine under a specific operating condition. The signal T thus obtained is fed to the power unit 40, but before entering this unit it may be further modified in the multiplier unit 42 by a signal emitted from the unit 41 which is able to increase the time T by multiplying it by a parameter $K \geq 1$, to obtain additional gas or petrol delivery under those engine operating conditions for which it is required.

The output signal from the unit 41 is obtained by processing the input signals which consist of the engine temperature, the temperature of the air drawn in, and an index representing the engine starting operation.

The power unit 40 which besides the signal T also receives a timing signal derived from the unit 36, amplifies the intensity of the signal T and feeds it with suitable timing to the electroinjectors.

FIG. 2 shows a first modification of the pressure modulator 18. Corresponding elements are indicated by the same numbers as used in FIG. 1.

The actual modulator consists of a chamber 43 in communication through a duct 17 with that region of a duct 10 downstream of a member 12 and closed by a membrane 44.

A rod 45 is connected to the rigid central portion of the membrane 44 and is also pivoted at 46 to one end of the two-armed lever 47.

The lever 47 is pivoted at 48, and is pivoted at 49 to the rod 50 connected to the rigid central portion of the membrane 51, which closes a chamber 52. A chamber 52 is in communication through a duct 53 with a delivery duct 24 of the gas or petrol pump and with a feed duct 26 for the electroinjectors 19, 20, 21, 22. A needle valve 54, engaged with a calibrated inlet port of the return duct 34 for the gas or petrol to the tank 31, is rigid with the rigid central portion of the membrane 51.

The area of the membrane 44 way be greater than the area of the membrane 51, and the leverage of the rod 45 is greater than the leverage of the rod 50, to give a suitable multiplication ratio of the force acting on the needle valve 54. This is necessary to overcome the opposing force due to the gas or petrol pressure, which on an average, is greater than the absolute value of the suction in the chamber 43. It is required for greater response accuracy as even small suction variations are transformed into considerable increases in the forces in play, which can be detected by the modulator.

If D is the diameter of the membrane 44, d the diameter of the membrane 51 and $\rho = (p_b/p_1)$ the ratio of the gas or petrol pressure upstream of the electroinjectors to the air pressure in the duct 10 downstream of the member 12, then $$(D/d) = \rho^{1/3}$$

If $c$ is the leverage of the rod 45, and $b$ the leverage of the rod 50, A is the area of the membrane 44 and a the area of the membrane 51, then the equilibrium equation for the forces acting on the membrane about the fulcrum 48 is $$A \cdot p_1 \cdot c = a \cdot p_b \cdot b$$

i.e.
$$(A/a) = (p_b/p_1)(b/c) = \rho \cdot (b/c)$$
$$\rho = (A/a)(c/b)$$

If $\phi$ is the angle of rotation of the lever 47 about the fulcrum 48, then for correct membrane operation:

$$\begin{cases} c\phi \equiv D \equiv \sqrt{A} \\ b\phi \equiv d \equiv \sqrt{a} \end{cases} \text{ and therefore } \frac{c}{b} = \sqrt{\frac{A}{a}}$$

$$\rho \equiv \frac{A}{a}\sqrt{\frac{A}{a}} = \frac{A}{a}^{3/2}$$

and therefore $(D/d) = \rho^{1/3}$

When the engine air intake rate increases, the butterfly valve 13 rotates about its axis to increase the air passage cross-section in the duct 10.

The relationship between the air passage cross-section and the engine air intake rate, and consequently the relationship between the suction downstream of the butterfly valve 13 and the latter, depend on the rigidity characteristic of the spring 15.

When the suction downstream of the butterfly valve 13 increases, the force acting on the membrane 44 increases because of the pressure differences across its faces. This force (which in the figure is directed upwards) tends to rotate the lever 47 clockwise and to move the needle valve 54 in the direction which intercepts the return duct 34, thus reducing the gas or petrol passage cross-section. Consequently the gas or petrol pressure on the pump delivery side and upstream of the electroinjectors increases. The gas or petrol pressure passes from a minimum valve corresponding to low loads and small air flow rates to a maximum value corresponding to maximum loads and high air flow rates, varying in accordance with a law which is a function of the suction downstream of the butterfly valve 13 (for a given profile of the needle valve 54).

The ability to work at a lower operating pressure when the engine air intake rate and hence the gas or petrol delivery to the electroinjectors are small is very advantageous because, for equal amounts of gas or petrol injected, the opening times for the injectors may be extended in relation to the case in which the operating pressure is higher. This avoids those metering errors which occur in injection systems in which the operating pressure is constant and chosen at a value so as not to excessively prolong the duration of opening of the electroinjectors at high loads, i.e. when the gas or petrol flow rates required by the engine are high.

By varying the gas or petrol pressure with the suction downstream of the butterfly valve 13, which is a function of the engine air intake rate, those metering errors which derive from the insensitivity of the transducer 16 to small flow rate variations on account of the friction to which its mobile element is subjected, are avoided.

The pressure changes downstream of the member 12 are measured by the modulator 18 even when they are slight, and give rise to changes in the gas or petrol pressure and hence in the delivery, in accordance with the changes in the air drawn in, so correcting the errors due to the lack of action of the transducer associated with the butterfly valve 13.

The modulator constructed in accordance with the embodiment of FIG. 2 is particularly suitable for multi-throttle engines, i.e. engines having as many throttle valves as there are engine cylinders. In this case the behavior of the suction in any individual intake duct is not influenced by the behavoir of the suction in the other intake ducts, and it is possible to phase the injection in such a manner that the gas or petrol is fed at predetermined suction values. It is not necessary to correlate the feed pressure to the electroinjectors with the suction downstream of the throttle valve because at the moment of injection this suction may be maintained at the required value under the various operating conditions. The feed pressure $p_b$ which appears in the expression for the injection pressure $p_i$ varies only as a function of the suction downstream of the butterfly valve 13, $p_b = \Delta p_a$, as $p_{asp}$ is constant.

The modulator shown in FIG. 3 differs from that shown in FIG. 2 in that it enables the feed pressure to the electroinjectors to be also controlled as a function of the suction in the intake duct downstream of the throttle valve.

This second embodiment is applicable particularly to single throttle engines in which the behavior of the suction in the intake manifold is influenced by the behavior of the suction in the ducts branching off downstream, and it is therefore more difficult to define the value of this suction at the moment of injection.

The modulator 18 consists in this case of the chamber 43 and the relative membrane 44, the chamber 52 and the membrane 51, the lever mechanism connecting the two membranes, i.e. the rods 45 and 50 and the lever 47, and the chamber 55 being connected by the duct 23 to the portion of the intake duct downstream of the throttle valve 11, and closed by the membrane 56.

A rod 57 is connected to the rigid center portion of the membrane 56 and pivoted at 58 to one end of the lever 47 and to the rod 50, which is in its turn connected to the membrane 51.

The needle valve 54, rigid with the membrane 51, is operated in this case by superimposing of the control impulses from the membrane 44 and from the membrane 56 in such a manner that the gas or petrol pressure upstream of the electroinjectors is controlled by the suction in the duct 10 downstream of the butterfly valve 13, and by the suction downstream of the throttle valve 11, which is an average of the suction in the individual intake ducts.

For a certain suction value downstream of the member 13, and hence for a predetermined engine air intake rate, the needle valve 54 is induced by the membrane 56 to open or close according to whether the suction downstream of the butterfly valve is higher or lower than a certain reference value, and consequently the gas or petrol pressure upstream of the electroinjectors falls or rises.

Figure 4:
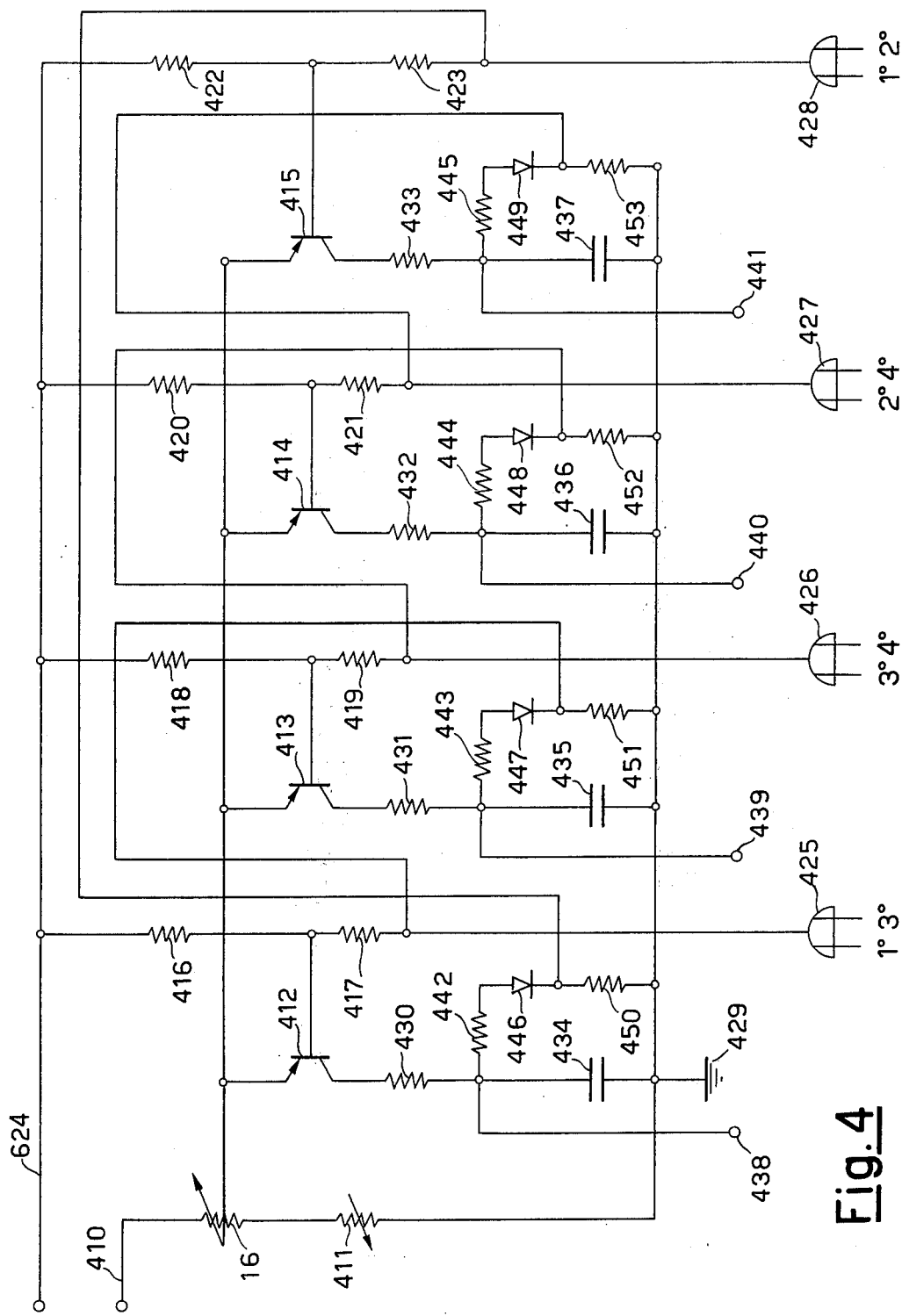
FIG. 4 shows circuit diagram of a portion of unit 37 and the basic electronic unit 38.

The purpose of the modulator of FIG. 3 is again to correlate the injection pressure $p_i = p_b - p_{asp}$ with the air pressure drop $\Delta p_a$, but in this case, because of the variability of pressure in that region of the intake duct in which the electroinjectors deliver, the gas or petrol feed pressure is also modified as a function of this variable in accordance with the relationship $p_b = p_{asp} + \Delta p_a$. In FIG. 4 there is shown the circuit diagram of a portion of the unit 37 and the basic electronic unit 38. In this Figure the reference number 410 designates a stabilized voltage line having a prefixed voltage value lower than the car battery voltage, which line supplies the potentiometer 16, whose slider is linked to the shaft of the throttle 13. The potentiometer 16 is connected to ground via a trimming resistor 411, whereas the slider thereof is connected to the emitters of four PNP transistors 412, 413, 414 and 415.

The base of each transistor is connected to a circuit node between a pair of resistors 423/422, 421/420, 419/418 and 417/416, respectively, which are serially connected between a supply line carrying the car battery voltage, and OR circuits 425, 426, 427 and 428 respectively.

The collector of each transistor is grounded at 429 through a series circuit of resistors 430, 431, 432 and 433 respectively, and of capacitors 434, 435, 436, and 437 respectively; a circuit node between the above mentioned resistor and capacitor is connected to circuit output terminals 438, 439, 440 and 441 respectively, and is further connected to ground through a series circuit of resistors 442, 443, 444 and 445, respectively, of diodes 446, 447, 448 and 449, respectively, and of further resistors 450, 451, 452 and 453, respectively.

The cathode of the diode 446 is connected to a circuit node between the resistor 423 and the OR circuit 428; the cathode of the diode 447 is connected to a circuit node between the resistor 417 and the OR circuit 425, the cathode of the diode 448 is connected to a circuit node between the resistor 419 and the OR circuit 426; and the cathode of the diode 449 is connected to a circuit node between the resistor 421 and the OR circuit 427.

The above described circuit delivers the signal for the basic injection adjustment, which signal is represenative of the injection time $T_B = 2a/n$; this signal consists of the voltage value which is generated at the respective output terminals (438 to 441), each of which is concerned with a respective electroinjection.

In order that the operation of the circuit is made clear, we will explain in which manner the output signal at an output terminal (for example, the terminal 438) is generated, since the output signals at the other output terminals is generated likewise, in a sequential order which depends on the ignition order of the motor cylinders fed by the electroinjectors (19 through 22 in FIG. 1).

As previously mentioned, the unit 35 delivers signals formed by trains of pulses, which are transformed in the unit 36 into electric pulsating signals of suitable shape, which contain tachometric and phase information related to the motor shaft. In the unit 36 there are formed as many electric pulsating signals as there are motor cylinders, (four in the particular case), which signals reach the units 40 and 37 simultaneously; these signals, suitably phased with respect to each other and the motor shaft, carry cyclically a low voltage level (L) and a high voltage level (H). Each signal, while passing from the state H to the state L, controls triggering of the coil of the respective electroinjectors, which open starting the fuel supply and simultaneously actuate one of the timers, contained in the unit 40; the actuated timer provides for the counting of the injection time, i.e. of the time during which the electroinjector remains open, on the base of the information contained in the signal provided by the unit 42.

Figure 8:
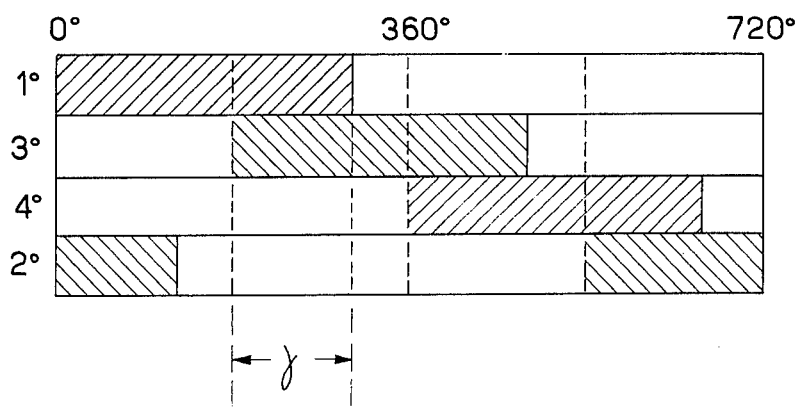
FIG. 8 shows the respective injection signals.

The angle of each electroinjector which remains again encompasses a range between 180° and 360° of the motor angle, so that, for a given angle $\gamma$, there are concurrently open the two electroinjectors of the two cylinders which follow one another in the ignition order; during the time employed by the motor to run through this concurrence angle $\gamma$ the state L is maintained by the two signals, which are fed by the unit 36 to the two electroinjectors of the two cylinders which follow one another in the explosion order (see the schematic diagram of FIG. 8).

The four pairs of signals which are thus produced are the inputs of the four OR circuits 425 through 428 respectively; and, when both the signals of a pair of signals of an OR circuit are in the state L, they control the switching of the output of the same OR circuit from the state H to the state L.

With reference to FIG. 1, assume that the injectors 19, 20, 21, 22 are respectively the fuel injectors for the first, second, third, and fourth cylinders of a four cylinder motor; assume also that the unit 36 is feeding the signals which control the opening of the electroinjectors 19 and 21 (having stated that the first, third, fourth and second cylinders follow one another in the ignition order) and that these two signals supplied to the electroinjectors of the first and third cylinders, respectively, are the inputs for the OR circuit 425. When these two signals are concurrently in the state L, the OR circuit 425 switches to the state L, starting conduction: in this condition the resistors 416 and 417 are connected to ground, and the emitter base junction of the transistor 412 is subjected to forwared bias, the transistor 15 switched on and starts the charging period for the capacitor 434, the duration of which phase depends on the time during which the OR circuit 425 remains in the state L.

As soon as one of the signals entering the OR circuit 425 switches to the state H, the output of the same OR circuit switches to the state H and the OR circuit switches off, thereby causing the transistor 412 to swtich off, and the charging of the capacitor 434 to be interrupted.

The charge stored in the capacitor remains unvaried until the diode 446 receives a forward bias; this happens when the OR circuit 428 switches on to the state L. In this situation the capacitor 434 is allowed to discharge through the resistor 442 and be prepared for the subsequent charging perid. The final voltage to which the capacitor 434, is charged which voltage is drawn from the terminal 438, depends on the charging voltage, i.e. on the voltage available on the slider of the potentiometer 16, which is a function of the angle of the throttle 13, and depends on the charging time of the same capacitor, i.e. on the time employed by the motor to make a rotation of the angle $\gamma$; which is, in turn, inversely proportional to the rotation speed of the motor; therefore, the output signal of the circuit is $T_B = (\alpha a/n)$.

Figure 5:
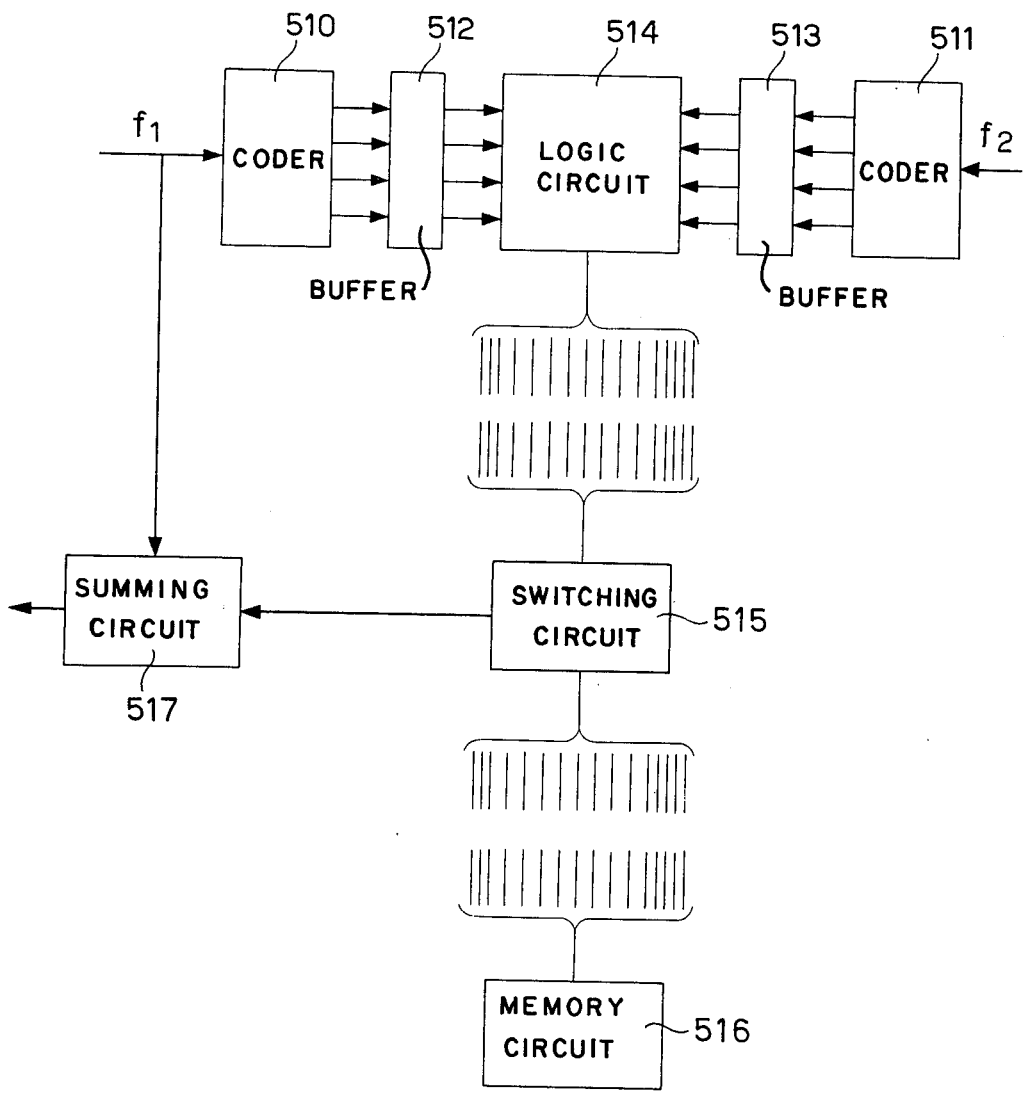
FIG. 5 shows a block diagram of refining circuit 39.
Figure 6:
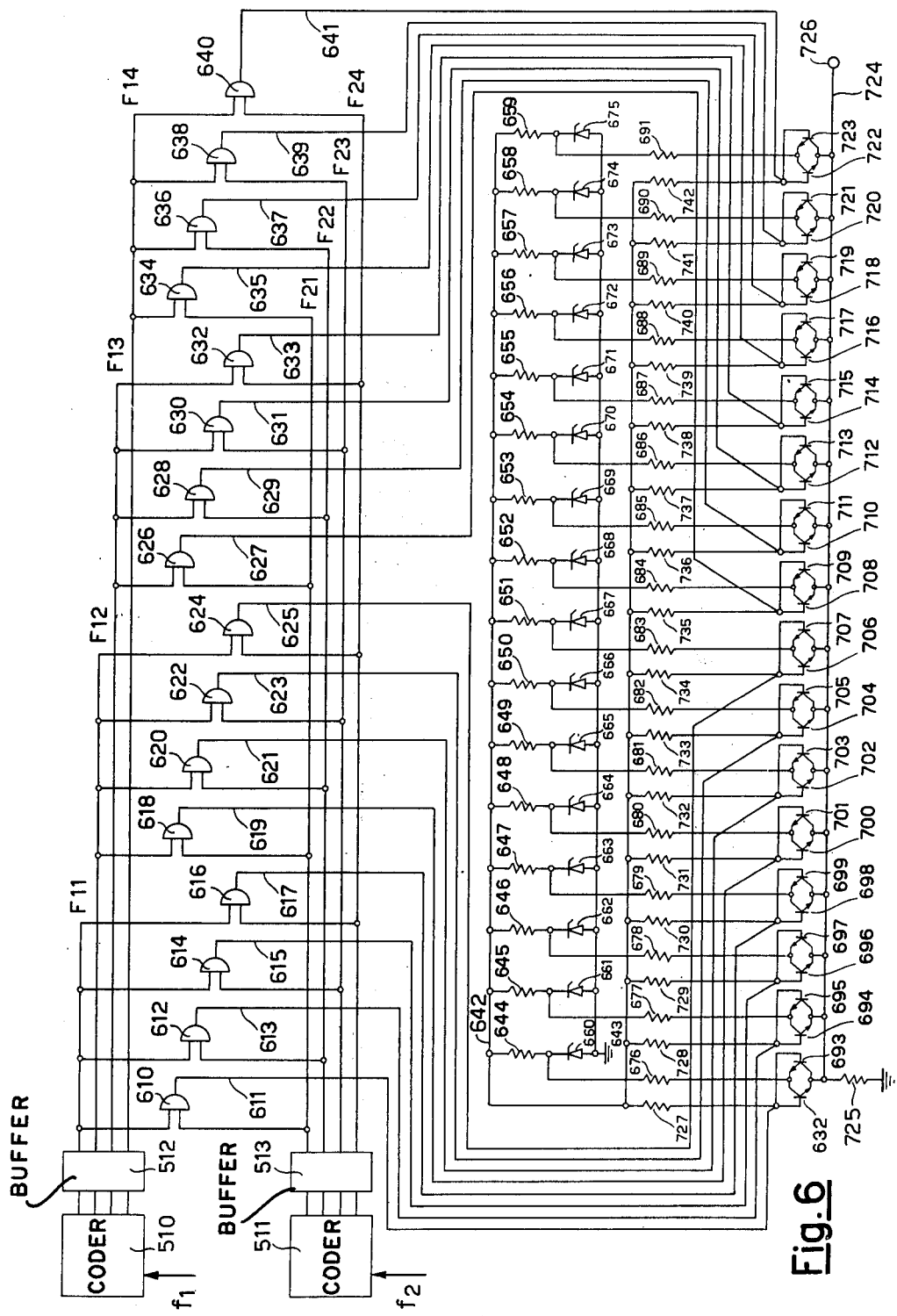
FIG. 6 shows a circuit diagram of refining circuit 39.

In FIG. 5 there is shown a block diagram of the refining unit 39, and in FIG. 6 there is shown a circuit diagram of the same unit. Two signals f1 and f2 enter this unit: the signal f1 is supplied by the unit 38, and is representative of the injection time corresponding to the basic adjustment, and the signal f2 is supplied by the circuit of the unit 37, not shown, which integrates the pulsating signal from the unit 36 and delivers a direct signal, whose value is a function of the rotation speed of the motor.

A signal of a preselected value is associated with each pair of values of the two input signals, and is subsequently used to correct the same signal f1 which arrives directly from the unit 38, and to generate the output signal.

The unit 39 comprises two circuits 510 and 511, structurally and operatively identical, which are designated herein as coders, this meaning that each circuit processes one of the two input signals (f1 and f2) and transforms the same signal, which is a continuous time function, into a discontinuous step signal. This is equivalent to consider the reason of variation of the continuous input signal of the coding circuit as divided into a number of intervals, and to provide the output signal of the same coding circuit with a preselected intermediate value of an interval each time the input signal reaches values within the range of that interval.

Each coding circuit is provided with a number of outputs equal to the number of intervals into which the region of variation of the input signal is divided, and each output provides for a signal formed by the preselected value (intermediate in the corresponding interval) of the input signal: in the embodiment shown in the Figure each coding circuit is provided with four outputs.

If the output signal reaches a value close to, or coincident with the end or final value of an interval, the coding circuit supplies two signals: one is formed by an intermediate value of the same interval; the other is formed by an intermediate value of the adjacent interval, so that a discontinuous switching of the output signal from the intermediate value of one interval to the intermediate value of an adjacent interval is avoided.

The signals supplied by the two coding circuits 510 and 511 reach the matching circuits 512 and 513, and then the logic circuit 514, which is formed by AND elements in number equal to that of the possible combinations of the input signals: for each pair of input signals for the logic circuit (one signal being supplied by the coding circuit 510 and the other one being supplied by the coding circuit 511) the corresponding AND element of the logic circuit is switched on in the example considered herein (see also FIG. 6); the logic circuit is provided with sixteen AND elements corresponding to the possible electric combinations of the four signals supplied by the coding circuit 510 and the four signals supplied by the coding circuit 511.

The logic circuit 514 is connected to a switching circuit 515, which is in turn connected to a memory circuit 516 formed by a store or memory with preformed voltage levels, which in this case are 16.

In order to better clarify the operation of the logic cricuit and of the memory circuit, reference can be made to a mathematical squared matrix having sixteen elements, in which the row and column vectors are, respectively, the four signals which may be delivered by the first coding circuit, and the four signals which may be delivered by the second codigin circuit. The intersection of a row vectors and of a column vectors, i.e. the combination of two signals supplied by the two coding circuit, defines one of the sixteen elements of the matrix.

When one of the two coding circuits delivers more than one signal (because the input function of the same coding circuit reaches a value close to, or coincident with the end value of an interval), more than one combination of the same signals supplied by the two coding circuit occurs, so that more than one AND circuit is actuated, and two or four elements of the memory are energized with a respective level of a predetermined voltage.

By considering the mathematic analogy, we basically have the following situations:

a) there are two column vectors or two row vectors near a row vectors or a column vectors respectively: in this case their intersection allows location of two adjacent elements of the matrix (i.e. two adjacent voltage levels of the memory circuit);

b) there are simultaneously two row vectors and two column vectors which allow, through their intersections, location of four elements of the matrix which are adjacent to each other.

In the event that only one AND circuit is actuated, at the output of the switching circuit 515 a voltage level corresponding to the actuated element of the memory circuit 516 is generated; in the event that more than one AND circuit is actuated, at the output of the switching circuit 515 there is generated a voltage level consisting of a value close to the average value of the voltage levels corresponding to the actuated adjacent elements of the memory circuit 516.

The signal supplied by the switching circuit 515 reaches the combining circuit 517 (a multiplying or summing circit), where also the signal directly supplied from the unit 38 enters; the first signal which reaches discrete voltage values is multiplied; or algebrically added to the second signal formed by a continuously varying voltage, so that also the signal generated at the output of the circuit 517 is a continuously varying voltage.

This voltage signal, failing a correction signal supplied by the unit 41, respresents the remaining open time which is necessary in order that each electroinjector delivers, by the fuel pressure being controlled by the modulator 18, the fuel amount corresponding to the mixture ratio required by the motor in the particular operating condition, which is characterized by a given air intake and a given speed of rotation.

In FIG. 6. there are further schematically represented the two coding circuits 510 and 511, and the two matching circuits 512 and 513; the two coding circuits could be two integrated circuits of the UAA 170 Siemens type coupled to a transistor and resistor network having the function of matching the voltage levels at the output of the same integrated circuits with the logic circuit 514.

The matching circuit 512 connected to the coding circuit 510 is provided with four outputs F11, F12, F13, F14; also the matching circut 513 connected to the coding circuit 511 is provided with four outputs F21, F22, F23 and F24; each output of one circuit and each output of the other circuit are connected to one of the AND circuits of the logic circuit 514; F11 and F12 are connected to the AND circuit 610, whose output is indicated by 611; F11 and F22 are connected to the AND circuit 612, whose output is indicated by 613; F11 and F24 are connected to the AND circuit 614, whose output is indicated by 615, and so, on up to the output F14 and F24, which are connected to the sixteenth AND circuit 640, whose output is indicated by 641.

Figure 7:
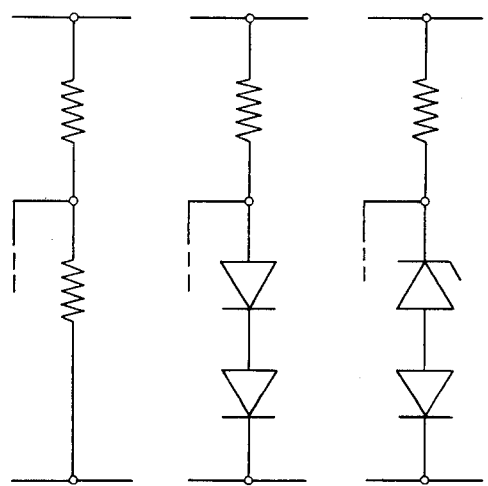
FIG. 7 shows alternative embodiments of the predetermined voltage generators of FIG. 6.

As previously stated, the memory circuit 516 is a store or memory with sixteen predetermined voltage levels, which are obtained in this particular case through the serial connection of a resistor (644 - 659) and of a Zener diode (660 - 675) between a stabilized voltage line 642 and the ground 643; the voltage sensed at the intermediate node between the resistor and the Zener diode, when the line is on, has a value which is predetermined during planning. Clearly, the voltage generators could be different from those shown in the Figure, for example they could be formed by resistive voltage dividers, by a serial connection of a connector of a resistor, a Zener diode and a diode, or by a serial connection of a resistor and two or more diodes (see FIG. 7).

Each intermediate node between the serially connected resistor and Zener diode of the memory circuit is connected to respective resistors 676 – 691, respectively, which are in turn connected to the parallel circuits of two NPN transistors 692-723, respectively, having reverse directed base-emitter junctions, so that the emitter of one is connected to the collector of the other.

The intermediate node between the emitter of one transistor and the collector of the other transistor is connected to the line 724, which is grounded through a resistor 725, and is also connected to the output terminal 726.

The bases of each pair of transistors are connected to one another, and are also connected through a resistor (respective resistors 727-742 to the stabilized voltage line 642; the bases of each pair of transistors are also connected to the output of an AND circuit; in this manner the bases of the pair of transistors 692 and 693 are connected to the output 611 of the AND circuit 610; the bases of the pair of transistors 694 and 695 are connected to the output 613 of the AND circuit 612, and so on.

In order to explain operation of the above described circuit, reference will be made to the case that the line including the resistor 644 and the Zener diode 660 of the memory circuit is switched on. The switching on of this line is caused by the switching-on of the transistor 692 (while the transistor 693 is off), i.e. by the positive bias of its base, which is provided by the AND circuit 610 when its output 611 switches from the state L (LOW) to the state H (HIGH), since both input signals F11 and F21 reach the level H. In this case at the output terminal 726 of the circuit there is sensed a voltage level of predetermined level, which depends on the voltage value of the line 642, the ohmic value of the resistor 644, and the type of the Zener diode 660.

At the circuit output terminal 726 there can also be generated a voltage level which is intermediate between that made available by a pair of lines formed by the series resistor Zener diode or also intermediate between that made available by four lines: this happens when two or four lines are simultanesouly energized.

Assuming that the two lines include the resistor 644 and the Zener diode 660 on one hand and, the resistor 645 and the Zener diode 661 on the other hand, then, if the law of Kirchhoff is applied to the node to which the intermediate node between the emitter and collector of the pair of transistors 692 and 693, and, the intermediate node between the emitter and the collector of the pair of transistors 694 and 695 are connected, and since the ohmic value of the resistor 725 is much higher than that of the resistors 676 and 677, -which are of identical value, -it is seen that the voltage at this node, which is also connected to the circuit output terminal 726, has the value:

$$V = \frac{V_{11} + V_{12}}{\frac{r}{R} + 2} \simeq \frac{V_{11} + V_{12}}{2} \text{ if } r << R$$

where r represents the ohmic value of the resistors 676 and 677 and R is the ohmic value of the resistor 725, and where $V_{11}$ and $V_{12}$ are the voltage levels at the node of the resistor 644, and the Zener diode 660 on one hand, and at the node of the resistor 645 and the Zener diode 661 on the other hand.

In this case, if $V_{11} V_{12}$ is assumed it will be V V $V_{12}$ and, therefore, the pair of transistors 694 and 695 will cause the transistor 695 arranged with the base-emitter junction reversed with respect to that of the transistor 694, to conduct while the transistor 694 will be off.

What we claim is:

1. An electronic indirect petrol injection system for an Otto cycle engine, the engine including a drive shaft and having a plurality of cylinders, each cylinder having an operative cycle including an intake stage, comprising at least one air intake duct, one electroinjector for each of the engine cylinders, a feed circuit to feed petrol to said electroinjectors under pressure, an electronic assembly for controlling injection timing and duration during the cylinder intake stage; a butterfly throttle valve in said engine intake duct for throttling air drawn in, a measuring element for determining air flow rate, said measuring element being disposed upstream of said throttle valve and including a throttle member defining the cross-section of an air passage port, the air being subjected to a pressure drop on traversing said port, said cross-section and said pressure drop varying with the engine air intake rate, a first mechanical-electrical transducer associated with said throttle member for generating an electrical signal indicative of the position assumed by said throttle member and hence of the air passage port cross-section; a petrol pressure modulator disposed in the petrol feed circuit for said electroinjectors and arranged to vary the pressure as a function of the intake air pressure drop through said throttle member; a second transducer for supplying an electrical signal containing tachometric and phase information relative to the drive shaft, said second transducer including a shaft rotatable at a speed proportional to the speed of the drive shaft and suitably phase displaced relative to the drive shaft, said electronic assembly including a tachometric unit for processing the electrical signal from said second transducer and for providing a signal in dependence of the engine rotation speed, a basic electronic unit for processing the signal supplied by said tachometric unit and the electrical signal indicative of the position of said throttle member, the latter electrical signal originating from said first transducer, said base unit also providing an electrical signal representing the time during which each of said electroinjectors needs to remain open to provide, in conjunction with the petrol feed pressure controlled by said modulator, the petrol delivery corresponding to a predetermined mixture ratio, the electronic assembly also comprising a refining unit for modifying, for each pair of values represented by the signal originating from said base unit and the tachometric signal, the time signal originating from said base unit, and hence the petrol delivery to said injectors and the mixture ratio in such a manner as to optimize the engine operation at all points throughout its range of use; and a unit arranged to distribute at a suitable timing to said electroinjectors the electrical signal determining the time and duration of opening of each of said electroinjectors during the time determined by the signal provided by said refining unit.

2. An electronic indirect petrol injection system as claimed in claim 1 wherein said petrol feed circuit for said electroinjectors comprises a petrol tank and a feed pump for drawing petrol from said tank, a delivery duct for delivering the petrol to said electroinjectors and said pressure modulator, said modulator including a first chamber provided with a first elastically deformable wall in communication with a region of said engine intake duct disposed downstream of said throttle member and upstream of said butterfly throttle valve, a second chamber provided with a second elastically deformable wall and in communication with the pump delivery duct, a petrol return duct including a valve element, said second chamber communicating through said petrol return duct and said valve element with said tank, said valve being operatively connected to said second deformable wall, a linkage for connecting said deformable walls in such a manner that movements of one of said walls in a direction perpendicular to the surface thereof induces proportional movements of the other of said walls in a direction perpendicular to the surface thereof, various positions assumed by said second wall corresponding to different respective positions of said valve element and different respective sizes of the petrol passage cross-section in the return duct to said tank, said valve element being drivable to reduce the passage cross-section of said petrol return duct when the air pressure drop across said air passage port determined by said throttle member increases, the petrol pressure in said pump delivery duct upstream of said electroinjectors increasing as the passage cross-section of said return duct decreases.

3. An electronic indirect petrol injection system as claimed in claim 2, wherein said first elastically deformable wall is greater in area than the area of said second elastically deformable wall.

4. An electronic indirect petrol injection system as claimed in claim 2, wherein said modulator comprises a third chamber provided with a third elastically deformable wall in communication with a region of said engine intake duct disposed downstream of said butterfly throttle valve, said valve element being operatively connected to said third deformable wall and drivable to reduce the passage cross-section of said petrol return duct to said tank when the pressure in the intake duct downstream of said butterfly throttle valve increases, different positions assumed by said valve element depending on the superposition of movements carried out by said first deformable wall and said third deformable wall.

5. An electronic indirect petrol injection system as claimed in claim 1, wherein said basic electronic unit includes at least one resistor-capacitor group connectable to a stabilized voltage line of a predetermined value, switching means for connecting the stabilized voltage line to said resistor-capacitor group through said mechanical-electrical transducer associated with said throttle member on which the cross-section of the passage port of the air drawn-in by the engine depends, said switching means being switchable to an on position to allow charging of a capacitor of the resistor-capacitor group, a first logic circuit for charging said capacitor thereby, said first logic circuit being reachable by a first preselected pair of signals supplied by said tachometric unit and being switchable to an on position for the time necessary for the drive shaft to make a rotation of a first predetermined angle in which said pair of signals attain predetermined values, discharging means connected to said capacitor, a second logic circuit for controlling said discharging means and reachable by a second preselected pair of signals supplied by said tachometric unit, said second logic circuit being switchable to an on position for the time necessary for the drive shaft to make a rotation of a second predetermined angle, said second angle having a preselected phase relationship with said first angle, the charging voltage of said capacitor being a function of the structure of said mechanical-electrical transducer, the final charging voltage of said capacitor being a function of the charging voltage and of the duration of the charging period, the latter being determinable by the duration of the on position of said logic circuit.

6. An electronic indirect petrol injection system as claimed in claim 1, wherein said refining unit comprises a first coding circuit for transforming a first continuous signal into a discontinuous first step signal, the first continuous signal being a function of the position of said throttle member and being generated by the basic electronic unit, at least one output signal of said first coder corresponding to each of the steps of the first step signal, a second coding circuit for transforming a second continuous signal into a discontinuous second step signal, the second continuous signal being a function of the rotation speed of the engine and being generated by the tachometric unit, at least one output signal of said second coder corresponding to each of the steps of the second step signal; an assembly of logic circuits equal in number to the possible combinations of the signals provided by the coding circuits; a switching circuit connected to the logic circuit assembly, and a memory circuit formed by as many generators of respective predetermined voltage levels as there are logic circuits, said switching circuit extracting from said memory circuit a predetermined voltage level each time one of the voltage level generators is actuated by one of said logic circuits for extracting a voltage level intermediate between at least two of said predetermined voltage levels each time at least two of said voltage level generators are simultaneously actuated by respective ones of said logic circuits, the refining unit further comprising a combining circuit reachable on inputs thereof by a signal provided by said switching circuit and by a signal provided directly by said basic electronic unit respectively, said combining circuit being able to generate an output signal formed by the combination of the input signals thereinto.

7. An electronic indirect petrol injection system as claimed in claim 6, wherein said memory circuit includes an output terminal and a plurality of circuit groups, each of said circuit groups comprising a resistor and at least one diode serially connected between the stabilized voltage line of the predetermined value and ground, said groups equalling in number the number of said logic circuits, an intermediate node existing between said resistor and said at least one diode first and second NPN transistors connected in parallel and having reversely disposed base-emitter junctions, including first and second nodes between the collectors and emitters of said transistors, respectively, a second resistor for connecting said intermediate node to said first node, a further resistor of high ohmic value for connecting said second node to ground, said second node being also connected to said output terminal of said memory circuit, the bases of said first and second transistors being connected to one another, to the stabilized voltage line, and to the output terminals of said logic circuits, respectively.

8. An electronic indirect petrol injection system as claimed in claim 6, wherein said memory circuit includes an output terminal and a plurality of circuit groups, each of said groups comprising a resistor and a Zener diode serially connected between the stabilized voltage line of the predetermined value and ground, said groups equalling in number the number of said logic circuits, an intermediate node existing between said resistor and said Zener diode, first and second NPN transistors connected in parallel and having reversely disposed base-emitter junctions, including first and second nodes between the collectors and emitters of said transistors, respectively, a second resistor for connecting said intermediate node to said first node, a further resistor of high ohmic value for connecting said second node to ground, said second node being also connected to said output terminal of said memory circuit, the bases of said first and second transistors being connected to one another, to the stabilized voltage line and to the output terminals of said logic circuits, respective.

9. An electronic indirect petrol injection system as claimed in claim 6, wherein said memory circuit includes an output terminal and a plurality of resistive voltage dividing groups, each of said voltage dividing groups including two resistors serially connected between the stabilized voltage line of the predetermined value and ground, said groups equalling in number the number of said logic circuits an intermediate node existing between said two resistors, first and second NPN transistors connected in parallel and having reversely arranged base-emitter junctions, including first and second nodes between the collectors and emitters of said transistors, respectively, a third resistor for connecting said intermediate node to said first node, a further resistor of high ohmic value for connecting said second node to ground, said second node being also connected to said output terminal of said memory circuit, the bases of said first and second transistors being connected to one another, to the stabilized voltage line, and to the output terminals of said logic circuits, respectively.

10. An electronic indirect petrol injection system as claimed in claim 1, said electronic assembly comprising a correction unit for generating a signal capable of varying the output signal from said refining unit for engine operating conditions requiring additional petrol feed.

* * * * *